US009323805B2

(12) United States Patent
Davis, II et al.

(10) Patent No.: US 9,323,805 B2
(45) Date of Patent: Apr. 26, 2016

(54) SYSTEM AND METHOD FOR PROVENANCE FUNCTION WINDOW OPTIMIZATION

(71) Applicant: INTERNATIONAL BUSINESS MACHINES CORPORATION, Armonk, NY (US)

(72) Inventors: John Sidney Davis, II, Washington, DC (US); Maria Rene Ebling, White Plains, NY (US); Chitra Venkatramani, Roslyn Heights, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 13/780,093

(22) Filed: Feb. 28, 2013

(65) Prior Publication Data

US 2013/0179464 A1    Jul. 11, 2013

Related U.S. Application Data

(63) Continuation of application No. 12/046,779, filed on Mar. 12, 2008, now Pat. No. 8,392,397.

(51) Int. Cl.
*G06F 17/30* (2006.01)

(52) U.S. Cl.
CPC .......... *G06F 17/30389* (2013.01); *G06F 17/30* (2013.01)

(58) Field of Classification Search
CPC .................................................. G06F 17/30389
USPC ......................................................... 707/769
See application file for complete search history.

(56) References Cited

U.S. PATENT DOCUMENTS

| 4,665,520 | A | 5/1987 | Strom et al. |
| 6,581,056 | B1* | 6/2003 | Rao .................. G06F 17/30696 |
| 6,594,773 | B1 | 7/2003 | Lisitsa et al. |
| 6,658,477 | B1 | 12/2003 | Lisitsa et al. |
| 6,725,287 | B1 | 4/2004 | Loeb et al. |
| 6,748,440 | B1 | 6/2004 | Lisitsa et al. |
| 6,983,286 | B1 | 1/2006 | Sinha et al. |
| 7,010,538 | B1 | 3/2006 | Black |
| 7,222,182 | B2 | 5/2007 | Lisitsa et al. |
| 7,246,157 | B2 | 7/2007 | Cianciarulo et al. |
| 2003/0076784 | A1 | 4/2003 | Ta et al. |
| 2003/0084179 | A1 | 5/2003 | Kime et al. |
| 2003/0196276 | A1 | 10/2003 | Trask et al. |

(Continued)

OTHER PUBLICATIONS

Bose, A Conceptual Framework for Composing and Managing Scientific Data Lineage; Proceedings of the 14th Int'l Conference on Scientific and Statistical Database Management (SSDBM' 02); 2002; 5 pages.

(Continued)

*Primary Examiner* — Huawen Peng
(74) *Attorney, Agent, or Firm* — Tutunjian & Bitetto, P.C.; Jeff Tang (57) ABSTRACT

A system and method for managing provenance data are disclosed. In accordance with one method, input data elements assessed by a processing element are evaluated. The method further includes determining whether an input window comprising the input data elements includes a sufficient amount of relevant input data. If the input window does not include a sufficient amount of relevant input data, then the input data elements are designated for reference in response to a provenance query.

20 Claims, 5 Drawing Sheets

(56) References Cited

U.S. PATENT DOCUMENTS

| | | |
|---|---|---|
| 2004/0117037 A1 | 6/2004 | Hinshaw et al. |
| 2005/0185578 A1 | 8/2005 | Padmanabhan et al. |
| 2006/0004802 A1 | 1/2006 | Phillips et al. |
| 2006/0126713 A1 | 6/2006 | Chou et al. |
| 2006/0149849 A1 | 7/2006 | Raz |
| 2006/0197766 A1 | 9/2006 | Raz |
| 2006/0288045 A1 | 12/2006 | Raz |
| 2007/0043565 A1 | 2/2007 | Aggarwal et al. |

OTHER PUBLICATIONS

Groth et al., A Protocol for Recording Provenance in Service-Oriented Grids; Proc. of the 8th Int'l Conference on Principles of Distributed Systems (OPODIS'04); 2004; 12 pages.

Jeong-Hyon Hwang et al., High-Availability Algorithms for Distributed Stream Processing; ICDE; 2005, Japan; 12 pages.

Kiram-Kumar Reddy et al., Provenance-Aware Storage Systems; Proc. of the 2006 USENIX Annual Technical Conference; Jun. 2006; 14 pages.

Simmhan et al., A Survey of Data Provenance in e-Science; SIGMOD Record, vol. 34, No. 3; Sep. 2005; pp. 31-36.

Simmhan et al., Performance Evaulation of the Karma Provenance Framework for Scientific Workflows; IPAW 2006; ILCS 4145, 2006; pp. 222-236.

Vijayakumar et al., Towards Low Overhead Provenance Tracking in Near Real-Time Stream Filtering; Int'l Provenance and Annotation Workshop, 2006; 8 pages.

\* cited by examiner

SYSTEM AND METHOD FOR PROVENANCE FUNCTION WINDOW OPTIMIZATION

RELATED APPLICATION INFORMATION

This application is a Continuation application of co-pending U.S. patent application Ser. No. 12/046,779 filed on Mar. 12, 2008, incorporated herein by reference in its entirety.

BACKGROUND

1. Technical Field

The present invention relates to data management and query support in data analysis and, more particularly, to techniques for optimizing response time of queries about provenance of data elements that result from the analysis and transformation of input data streams.

2. Description of the Related Art

Data provenance involves the management of metadata about the history, generation and transformation of data. Data provenance is of special importance in large data processing systems in which data is operated on and routed between networked processing elements (PEs). The PEs in a stream processing system perform various operations on input data elements to generate output data elements. These output data elements are referred to as the results of the stream processing system. Examples of input data elements include packets of audio data, email data, computer generated events, network data packets, or readings from sensors, such as environmental, medical or process sensors. Examples of transformations conducted by individual PEs deployed on a stream processing graph include parsing a header of a network, aggregating audio samples into an audio segment or performing speech detection on an audio segment, subsampling sensor readings, averaging the readings over a time window of samples, applying spatial, temporal, or frequency filters to extract specific signatures over the audio or video segments, etc. The PEs produce results as a stream of output data elements or may produce individual output elements consumed by some external monitoring applications.

Data provenance applied to stream processing systems involves verification of the origins and causal factors of data produced by the system's PEs. A given data element that has a value of interest might lead to a query about the provenance of that datum, perhaps to determine why the data element has a particular value, or why the element was generated in the first place. The provenance query response requires an analysis of all upstream PEs and data consumed and generated by the upstream PEs, on which the datum of interest is dependent. Given the high data throughput of stream processing systems, a key challenge with managing provenance is the minimization of provenance query response times.

The standard approach for responding to provenance queries is to perform provenance function backtracing. In provenance function backtracing, each PE in a graph of processing elements maintains a provenance function that maps a given output event to a set of input events. When a query about a given output event occurs, the provenance function associated with the PE that generated the event is used to determine the precipitous input events. Once these input events have been identified, the provenance functions of the upstream analysis components which generated the input events are used to determine further upstream events that are indirectly related to the given output event. This process is repeated recursively until all relevant events have been identified.

Several points about provenance functions are worth noting. Most notably, provenance functions are distinct from the operations performed on input data streams by a processing element in that provenance functions map output data elements to sets of input data elements and, like PE operations, provenance functions can be mathematical functions and not simply relations. The fact that PE operations may not be functions and, more specifically, may not be invertible functions is a key motivator for why provenance functions are needed. Note further that while it is implicitly understood that PE operations are specified by an author of a PE, this may or may not be the case for a provenance function associated with a PE. A provenance function may be specified by the corresponding PE author, it may be specified by an author not responsible for the corresponding PE or the provenance function may be automatically generated using various techniques. These characteristics of provenance functions imply that a given output data element may be deterministically mapped to a specific set of input data elements during a provenance query event, though the corresponding PE operation may be non-invertible or even stochastic.

Provenance function backtracing can result in very inefficient provenance query responses. As described above, provenance functions map output events of a given PE to a set of input events for that PE. Given the time ordered nature of streaming data systems, the set of input events mapped to by provenance functions is referred to as a provenance input window. Due to the characteristics of provenance functions, as outlined above, the provenance input window may be conservatively specified such that only a small portion of the data contained within the window is directly relevant to the corresponding output event. The relevancy ratio is referred to as the ratio of the relevant provenance window data count to the provenance window size where the window size is the cardinality of the set of data events contained in the window. When the relevancy ratio of a provenance window is very small, this results in an unnecessarily large search space of data events to search through in response to a provenance query and the search space increases exponentially as the query traces upstream.

The degree of inefficiency of a provenance query depends both on the specification of the provenance function as well as the statistics of the input data with respect to the provenance function specification. Consider an example scenario in which a processing element consumes a single input stream of real number-valued data and produces an output event with a value that is equal to the average of the last ten input events that have had values greater than or equal to 50. If the stream of input data is such that most input events have values over 50, then on average the relevancy ratio will be high for each input window. If most input events are below 50, then on average the relevancy ratio will be low for each input window.

To further refine the example, assume a relevancy ratio of 1%, in this case, backtracing through a single processing element would produce, on average, input windows containing 1000 data events in which only 10 of the input events are directly relevant to a given output event. In a worst case scenario, as backtracing continues recursively upstream, this inefficiency will expand exponentially. Such inefficiencies result in slow provenance query response times since the space of data elements that must be searched to determine the provenance of a given output data event is unnecessarily large. Providing solutions to avoid this inefficiency are needed.

A significant amount of related work exists on providing solutions for infrastructures that manage provenance data. Such related work considers the best way to store provenance information independent of optimizing response time of data provenance queries. Rather, the focus of much of the previous work on data provenance considers whether provenance information should be stored as annotations attached to the appropriate data elements (see, e.g., K. Muniswamy-Reddy, D. Holland, U. Braun and M. Seltzer, *Provenance-Aware Storage Systems*, Proc. of the 2006 USENIX Annual Technical Conference, June 2006) or alternatively whether provenance information should be encoded in the processing elements of the data processing system (see, e.g., R. Bose, "A conceptual framework for composing and managing scientific data lineage", 14th International Conference on Scientific and Statistical Database Management, SSDBM'02, pp. 15-19).

Prior systems do not teach how to store and manage input data elements that were responsible for producing certain final output elements/events so that the data provenance queries can be answered efficiently in a stream processing system. The problem of efficiently querying for provenance information is not addressed. Also, no technique for efficient store and retrieval of data provenance information for analytic methods whose output elements/events depend on a subset of the input data elements that satisfy the certain characteristics is disclosed or suggested.

SUMMARY

A system and method for selection of a provenance dependency function in a stream-based data processing infrastructure to optimize backtracing performance in response to a provenance query includes determining performance of a set of dependency functions associated with an analysis component for determining relevancy of each input event received by the analysis component. The relevancy of each input event is determined according to each dependency function and storing a record of relevant events according to a recording method. Relevancy results of the dependency functions are aggregated, and the dependency functions are ordered according to a criterion. Data provenance is provided for a given output event using the input event recording method associated with a best dependency function according to the criterion.

There are key differences with the previous work and the present embodiments. Notably, much of the previous work considers provenance at the granularity of an entire data stream whereas the present work considers provenance at the level of individual data elements. More specifically, as will be shown, the present embodiments consider an optimization that may be applied at runtime or offline, to reduce provenance query response times whereas the previous work focuses on efficient ways for storing provenance data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide for optimizing response time of provenance queries in stream processing systems. At least one provenance function is provided that maps each output data event to a set of input data events. A mechanism for evaluating statistics of input data streams, at runtime and prior to provenance queries; with respect to a given provenance function is provided. An evaluation method is used to select an efficient backtracing method for responding to a provenance query such that the method optimizes response time. A method for further optimizing the backtracing method selection to take into consideration additional resources is also presented. The resources include but are not limited to memory and speed.

A system and method are provided for adaptively optimizing the response times of queries regarding data provenance in stream processing systems. In accordance with one aspect, a method for determining, prior to a provenance query, the most efficient means for mapping a given output event associated with a processing element to a set of predicating input events in response to a provenance query, is based on statistics of the input streams consumed by the processing elements. The processing element has at least one provenance function associated with it, and a method for evaluating the statistics of the input data consumed by the processing element is provided.

During execution, the input data statistics are evaluated to determine an efficient method for associating output events with sets of input events in anticipation of a provenance query regarding a given output event. This may be executed at runtime when the PEs are processing data, or offline on stored output data, after the processing is completed.

In additional embodiments, a relevancy criterion is specified that evaluates the statistics of input data during runtime, but prior to the occurrence of a provenance query. The relevancy criterion is used to dynamically select an efficient provenance function backtracing method during runtime, but prior to the occurrence of a provenance query. The relevancy criterion maps a set of input data events to a Boolean value and maintains a count of the number of True and False outputs to determine the input data statistics by maintaining a value of each input window's relevancy ratio.

In another embodiment, a runtime system for leveraging a relevancy criterion is used for determining if input window data should be cached. An exemplary embodiment of such a system operates by caching a pointer from an output event to a set of input events when the relevancy ratio of the corresponding input window is low, or elects to use the available provenance function for associating an output event with a set of input events when the relevancy ratio of the corresponding input window is high.

The relevancy criterion may be used to create a cache of input data, in an offline process. That is, the method is used either in a separate process after the stream-processing application has completed, or when a subsequent provenance query (say the first) is being evaluated. This permits the system to create the cache when the needed computation and storage resources are available to do so, and makes all subsequent provenance queries more efficient.

A system for runtime tuning of a provenance backtracing selection system is based on a set of available resources. The resources may include but are not limited to processing system memory and query response time speed. In an exemplary embodiment, a specification of the maximum cache size for storing input events associated with a given output event is provided. The maximum cache size is used to limit the number of input events stored and permits the system to elect a provenance function for query time evaluation when the cache size is exceeded. An alternative exemplary embodiment includes a specification of a maximum query response time used to limit the anticipated query response time. The maximum query response time is used to enforce the use of cached data when such usage will ensure that query response times are kept below the maximum response time limit.

Advantages of the present principles include adapting the runtime execution of provenance management methods in response to changing statistics of input data. As input data statistics vary, the present embodiments cache input data accordingly. A further advantage includes optimizing provenance query response time in accordance with input data statistics as well as specified provenance dependency functions associated with processing elements.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
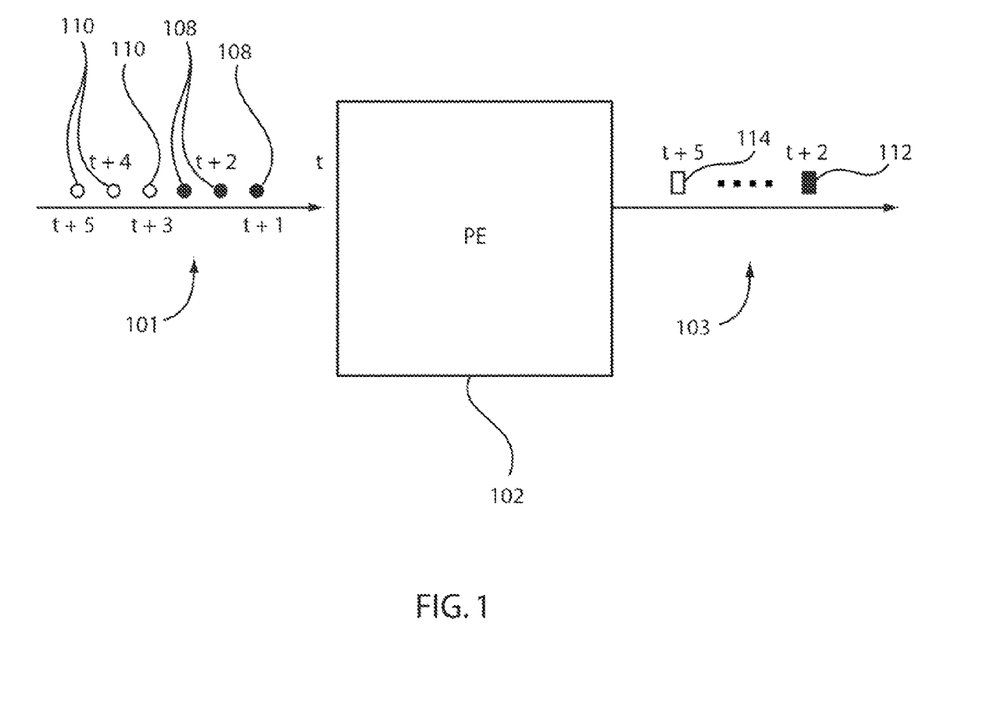
FIG. 1 is a diagram illustrating an exemplary stream processing element and an exemplary relationship between output data elements and a set of input elements that may contribute to a given output element.

Referring now to the drawings in which like numerals represent the same or similar elements and initially to FIG. 1, a diagram illustrates an exemplary stream processing element and an exemplary relationship between output data elements and a set of input elements that may contribute to a given output element. An input stream 101 in time interval [t, t+5] is input to a processing element (PE) 102. An output stream 103 is output at time interval [t+2, t+5]. Data elements 108 in input stream 101 may contribute to an output data element 112 in output stream 103, and data elements 110 in stream 101 may contribute to output data element 114 in output stream 103.

For example, it is common that an output data element at time t only depends on the input data elements within a time interval [t−a, t−b], where a μ b. In this example, we have a=2 and b=0, if the output is computed as the running average of the past three input data items.

Note in some cases, only a subset of the input elements in the time interval [t−a, t−b] really contribute to the output data element at time t. For example, the output data element is computed as the average of the input data streams values in time interval [t−a, t−b] whose values are bigger than, e.g., 50. In this case, only the input elements in time interval [t−a, t−b] with values bigger than 50 contribute to the output data element at time t.

In other cases, the parameters a and b in the dependency interval [t−a, t−b] may not be fixed values. For example, an output data element at time t may be computed as the average of the past 10 input data elements whose value is bigger than 50. In this case, the values of a and b depend on the input data distribution.

Given an output data element at time t and a provenance description that describes the conditions for an input data element to contribute to an output data element, it is desirable to know how to retrieve all the input data elements that really contributed to the output elements. One straightforward way of doing this is through backtracing. In this approach, all the possible input data elements are examined against a provenance description until all of the elements are found.

Figure 2:
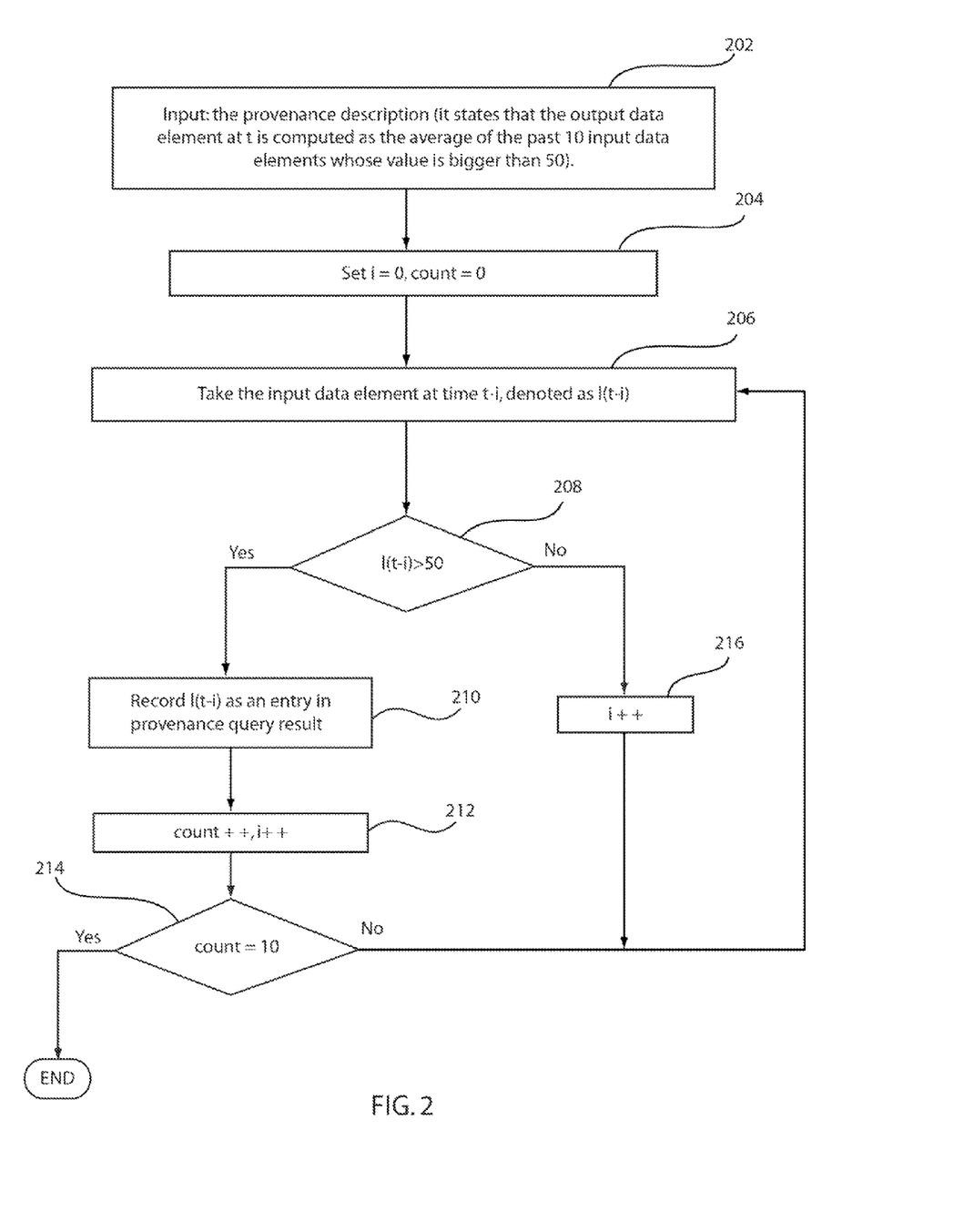
FIG. 2 is a block/flow diagram illustrating an exemplary execution of a system/method for performing backtracing in response to a data provenance query.

Referring to FIG. 2, a block/flow diagram illustrates an exemplary execution of a system/method for performing backtracing in response to a data provenance query. In this example, the provenance description, in block 202, states that an output data element at time t is computed as the average of the past 10 input data elements whose value is bigger than 50. The corresponding provenance function ($P_F$) for this example could be, e.g., $P_F$: $O(t) \rightarrow \{I(t-i)|i>=0\}$. A slightly more precise provenance function could be $P_F$: $O(t) \rightarrow \{I(t-i)|I(t-i)>50,$ and $i>=0\}$. A much more precise provenance function for the same example would be $P_F$:$O(t) \rightarrow \{I(t-k_j)|0<=j<10,\ 0<=\}k_o<k_1< \ldots <k_9,\ I(t-k_j)>50,$ and for $0<=j<10,$ for any $i<k_9,$ and $i \neq k_j,\ I(t-i)<=50)$. Other criteria are also contemplated and may be employed.

In a second example, the provenance description states that an output data element at time t is computed as the maximum value of the past 10 input data elements. The corresponding provenance function for this example could be $P_F$:$O(t) \rightarrow \{I(t-i)|0<=i<10\}$. In a third example, the provenance description states that an output data element at time t is computed as the running average of the past three values. The provenance function for this case could be $P_F$: $O(t) \rightarrow \{I(t), I(t-1), I(t-2)\}$.

In block 204, the index i and the "count" are initialized to zero. Next, in block 206, backtracing starts to check the values of the input data elements (indicated as I(t−i) at time t, t−1, t−2, . . . ). In block 208, each input data element is checked to determine if it is larger than 50. If the input data element is larger than 50, the input data element is recorded as an entry in a provenance query request in block 210. The count and index are incremented in block 212. A check is performed in block 214 to determine if 10 values larger than 50 have been found. If 10 such values are found, these 10 values, together with their time stamps, will be returned as the query result. If 10 values are not yet found, the program path returns to block 206. If in block 208 the I(t−i) is less than 50, the program increments i in block 216. The count check of block 214 is performed as well.

A drawback of the backtracing approach is performance: the query response time could be very long since it usually needs to examine many input data elements before it returns the query result.

Figure 3:
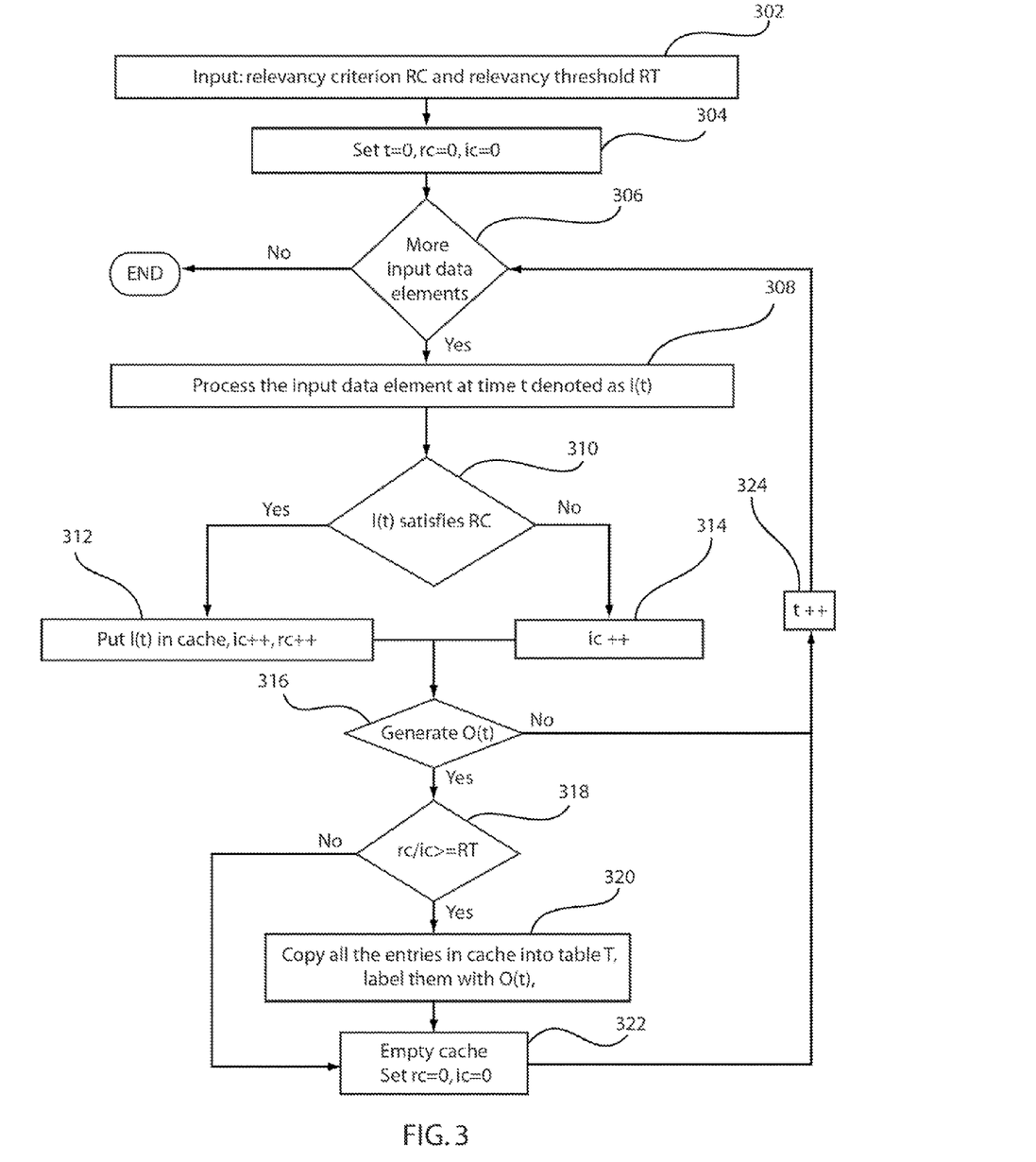
FIG. 3 is a block/flow diagram illustrating a system/method in accordance with present principles which takes a relevancy criterion at runtime (prior to a provenance query) and a tunable relevancy threshold as input for query processing.

Referring to FIG. 3, to improve the performance of a data provenance query through optimization, an illustrative system/method in accordance with present principles takes a relevancy criterion (RC, e.g., RC maps an input event to TRUE if its value is bigger than 50 and FALSE otherwise) at runtime (prior to a provenance query) and a tunable relevancy threshold (RT) (for example, RC could be set to 10%) as input in block 302. The system/method determines the input data elements corresponding to every output data element for the lifetime of the stream. This processing begins at the start of the stream at time t=0, set in block 304. Two counters are maintained during the execution of the method: an Input Counter (ic) and a Relevancy Counter (rc), which are also initialized to 0 at t=0 in block 304.

A check is made to determine if the stream is still active and there are more input data elements to process, in block 306. If there are no more input data elements to process, the method ends.

If there are more input data elements to process, then in block 308, the next input data element is processed by performing the following. In block 310, the input data element is checked to see it satisfies the RC. Each input data element is checked against the Relevancy Criterion (RC) and rc is incremented whenever an input data element satisfies the Relevancy Criterion (RC). During runtime of a process element, ic will be incremented when each input data element is processed. If the RC is satisfied, the input data element (I(t)) is recorded in a memory element or cache, and ic and rc are incremented in block 312.

Each input data element resulting in an increment in rc, is cached. If the RC is not satisfied, ic is incremented in block 314. In block 316, a check is made to see if an output event (O(t)) is generated. For example, if O(t) is defined as an output event with the value that is equal to the average of the last 10 events that have values over 50, we need to check if 10 input events with their values over 50 have been processed.

When an output event is generated, a relevancy ratio is computed as relevancy counter/input counter in block 318. If the relevancy ratio is above the given threshold RT (e.g., rc/ic RT), the cache is labeled (indexed) with the output data element and maintained in a table T for a future data provenance query on this output data element in block 320. The cache is then emptied and ic and rc are set to 0, in block 322. In the case that the relevancy ratio is not satisfied, the cache is similarly emptied in block 322, setting rc and ic to 0. Time t is incremented in block 324 and processing continues to block 306 to determine if there are more input elements to process.

If no output event is generated in block 316, time t is incremented in block 324 and the program path returns to block 306, to determine if there are more input data elements to process. Note that the relevancy threshold RT is a tunable parameter, e.g., between 0 and 100%. In general, RT should be set to a lower (higher) value when the available storage size for the maintained table T is smaller (larger).

One skilled in the art will realize that this embodiment assumes that each input element is associated with at most one output element. This can be easily overcome with additional bookkeeping of metadata.

Figure 4:
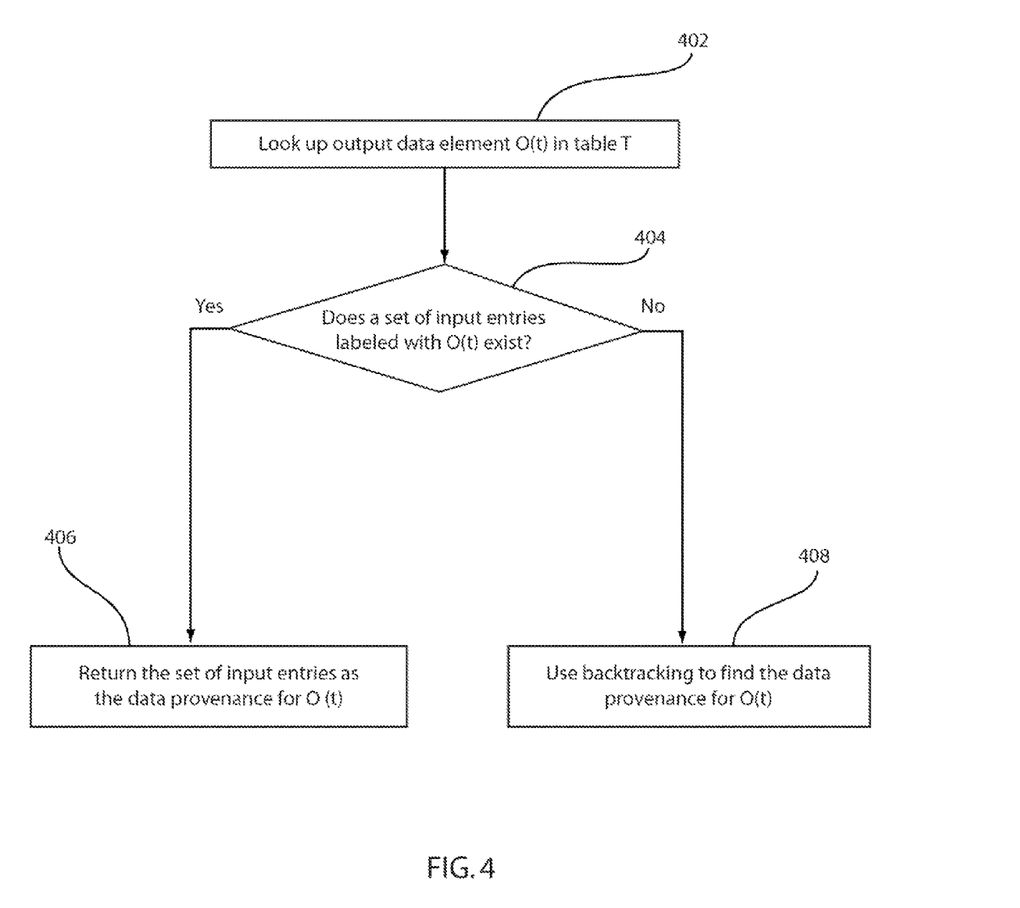
FIG. 4 is a block/flow diagram illustrating a system/method in accordance with present principles for query processing for a data provenance query.

Referring to FIG. 4, query processing for a data provenance query is illustratively shown. When a data provenance query is issued for a output data element O(t), we check the table T to see if there is any set of input data elements labeled with O(t) in block 402. A check of whether a set of input entries labeled with the output event is checked in block 404. If there is such a set, the set is returned as the answer to the provenance query in block 406. Otherwise, backtracing is employed in block 408.

Figure 5:
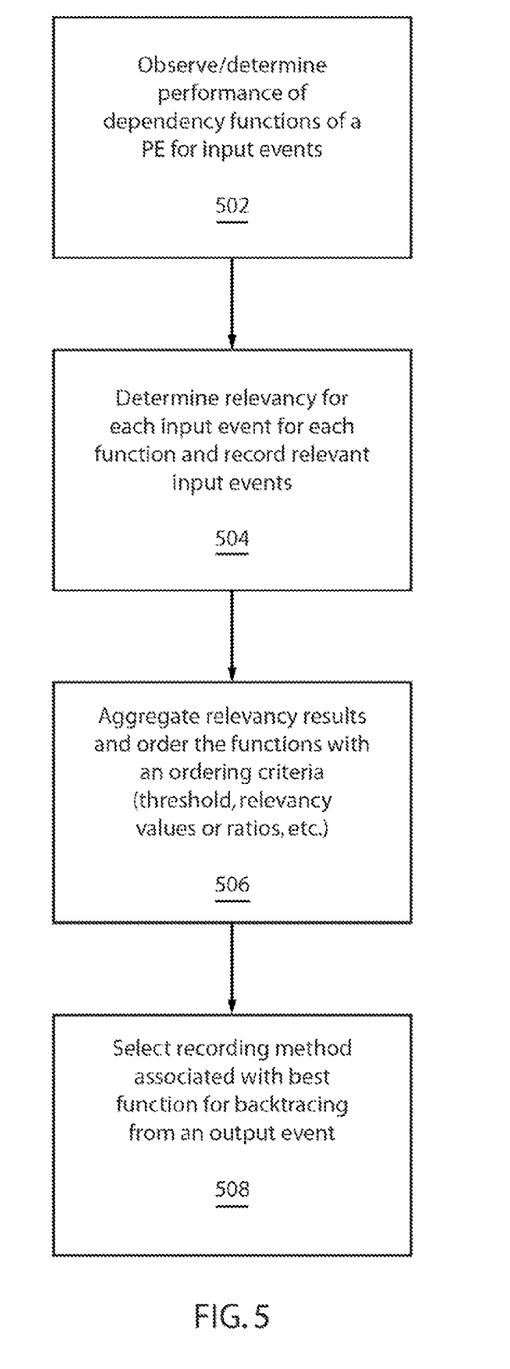
FIG. 5 is a block/flow diagram showing a system/method for runtime selection of a provenance output/input dependency function in a stream-based data processing infrastructure to optimize backtracing performance in response to a provenance query in accordance with the present principles.

Referring to FIG. 5, a system/method for selection of a provenance output/input dependency function in a stream-based data processing infrastructure to optimize backtracing performance in response to a provenance query is illustratively shown in accordance with one illustrative embodiment. In block 502, observing or determining performance of a set of dependency functions (e.g., output/input dependency functions) associated with an analysis component (e.g., a processing element) to determine the relevancy of each input event received by an analysis component is performed. This may include determining a relevancy measurement for each input event.

For example, if the output event at time t is computed as the average value of the input events at time t, t−2, t−18, the dependency function could be $O(t) \rightarrow \{I(t-i) | 0 <= i < 20\}$. However, a better dependency function would be $O(t) \rightarrow \{I(t-i) | 0 <= i <= 18$ and i is an even number$\}$. In general, the more effective/precise the dependency function is in selecting the relevant input elements, the better the backtracing function to answer provenance queries.

In block 504, the relevancy of each input event is determined according to each (output/input) dependency function, and a record is stored for each event that is determined to be relevant according to a recording method. Recording methods may include creating a table in a relational database and inserting all the relevant input events together with their time stamps in the table, or caching all the relevant input events using an in-memory data structure. Other recording methods may also be employed.

In block 506, the relevancy results are aggregated for each dependency function, and the dependency functions are ordered according to a particular criterion. Ordering criterion may include most to least relevant, or comparison to a relevancy threshold (RT). The ordering criterion may be based on computing a relevancy ratio. A relevancy counter (rc), which counts relevant inputs, and an input counter (ic) which counts input events, may be employed to compute a relevancy ratio as the ratio of: relevancy counts/input event counts. The criterion may include the relevancy threshold and the relevancy ratio may be compared to the relevancy threshold to determine whether an entry is added to a table indexed by a generated output event. The comparison of the relevancy ratio to the relevancy threshold may include that if the relevancy ratio is less than or equal to the relevancy threshold, all aggregated entries are copied into the table; otherwise, the entry is deleted.

In block 508, the input event recording method associated with a best output/input dependency function according to the ordering criterion is employed when backtracing from a given output event. Data provenance is provided for a given output event using the input event recording method associated with a best dependency function according to the criterion. This may include looking up an output event in the table and determining whether a set of input event entries exist which are associated with the output data element. If the output event has associated input event entries, the set is returned as data provenance for the provenance query. Otherwise, if the output event has no associated input event entries, backtracing is used to determine data provenance for the provenance query.

Having described preferred embodiments of a system and method for provenance function window optimization (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for optimizing provenance query response time, comprising:
   providing relevancy criteria that evaluates input data elements prior to an occurrence of a provenance query to dynamically select a provenance function backtracing method for responding to the provenance query that optimizes a response time of the provenance query;
   evaluating, by a hardware processor using the relevancy criteria, said input data elements to determine whether an input window comprising said input data elements includes a sufficient amount of relevant input data with respect to the provenance query; and
   if said input window lacks the sufficient amount of relevant input data, designating, by the hardware processor, said input data elements for reference to an output data element in a cache in response to the provenance query.

2. The method of claim 1, wherein said designating further comprises storing said input data elements in the cache.

3. The method of claim 1, wherein said designating further comprises indexing in the cache the output data element determined from at least one of said input data elements if said input window lacks the sufficient amount of relevant input data.

4. The method of claim 3, wherein said provenance query is for said output data element and wherein said method further comprises:
   referencing said cache in response to receiving said provenance query.

5. The method of claim 1, wherein said provenance query is for an output data element determined from at least one of said input data elements and wherein said method further comprises:
   applying a provenance function in response to receiving said provenance query if said input window does include the sufficient amount of relevant input data.

6. The method of claim 1, wherein the relevancy criteria dynamically selects the provenance function backtracing method during runtime and prior to the provenance query.

7. The method of claim 1, wherein the relevancy criteria maps a set of input data events to a Boolean value and maintains a count of the number of True and False outputs to determine statistics of the input data elements, the statistics being evaluated to dynamically select the provenance function backtracing method.

8. The method of claim 7, wherein the relevancy criteria maintains the count by maintaining a value of a relevancy ratio of the input window.

9. The method of claim 7, wherein the statistics are evaluated in anticipation of the provenance query for the output data element.

10. The method of claim 1, further comprising tuning, during runtime, the provenance function backtracing method based on available resources including memory.

11. A non-transitory computer readable storage medium comprising a computer readable program for optimizing provenance query response time, wherein the computer readable program when executed on a computer causes the computer to perform the steps of:
   providing relevancy criteria that evaluates input data elements prior to an occurrence of a provenance query to dynamically select a provenance function backtracing method for responding to the provenance query that optimizes a response time of the provenance query;
   evaluating, by a hardware processor using the relevancy criteria, said input data elements to determine whether an input window comprising said input data elements includes a sufficient amount of relevant input data with respect to the provenance query; and
   if said input window lacks the sufficient amount of relevant input data, designating, by the hardware processor, said input data elements for reference to an output data element in a cache in response to the provenance query.

12. The non-transitory computer readable storage medium of claim 11, wherein said designating further comprises storing said input data elements in the cache.

13. The non-transitory computer readable storage medium of claim 11, wherein said designating further comprises indexing in the cache the output data element determined from at least one of said input data elements if said input window lacks the sufficient amount of relevant input data.

14. The non-transitory computer readable storage medium of claim 13, wherein said provenance query is for said output data element and wherein said steps further comprise:
   referencing said cache in response to receiving said provenance query.

15. The non-transitory computer readable storage medium of claim 11, wherein said provenance query is for an output data element determined from at least one of said input data elements and wherein said steps further comprise:
   applying a provenance function in response to receiving said provenance query if said input window does include the sufficient amount of relevant input data.

16. The non-transitory computer readable storage medium of claim 11, wherein the relevancy criteria dynamically selects the provenance function backtracing method during runtime and prior to the provenance query.

17. The non-transitory computer readable storage medium of claim 11, wherein the relevancy criteria maps a set of input data events to a Boolean value and maintains a count of the number of True and False outputs to determine statistics of the input data elements, the statistics being evaluated to dynamically select the provenance function backtracing method.

18. The non-transitory computer readable storage medium of claim 17, wherein the relevancy criteria maintains the count by maintaining a value of a relevancy ratio of the input window.

19. The non-transitory computer readable storage medium of claim 17, wherein the statistics are evaluated in anticipation of the provenance query for the output data element.

20. The non-transitory computer readable storage medium of claim 11, further comprising tuning, during runtime, the provenance function backtracing method based on available resources including memory.

\* \* \* \* \*